(12) United States Patent
Linder et al.

(10) Patent No.: US 11,644,107 B2
(45) Date of Patent: May 9, 2023

(54) FRONT LOADED SEAT SEAL

(71) Applicant: FMC Technologies, Inc., Houston, TX (US)

(72) Inventors: Scott E. Linder, Spring, TX (US); Robert P. Matson, Cypress, TX (US); Calvin C. Liu, Missouri City, TX (US)

(73) Assignee: FMC Technologies, Inc., Houston, TX (US)

( * ) Notice: Subject to any disclaimer, the term of this patent is extended or adjusted under 35 U.S.C. 154(b) by 246 days.

(21) Appl. No.: 16/303,164

(22) PCT Filed: May 20, 2016

(86) PCT No.: PCT/US2016/033431
§ 371 (c)(1),
(2) Date: Nov. 20, 2018

(87) PCT Pub. No.: WO2017/200546
PCT Pub. Date: Nov. 23, 2017

(65) Prior Publication Data
US 2020/0124186 A1    Apr. 23, 2020

(51) Int. Cl.
*F16K 3/20*    (2006.01)
*F16K 3/02*    (2006.01)
(Continued)

(52) U.S. Cl.
CPC .............. *F16K 3/20* (2013.01); *F16K 3/0227* (2013.01); *E21B 2200/01* (2020.05);
(Continued)

(58) Field of Classification Search
CPC .......... F16K 3/20; F16K 3/0227; F16K 3/314; F16K 31/314; F16K 41/086;
(Continued)

(56) References Cited

U.S. PATENT DOCUMENTS 2,810,543 A * 10/1957 Bryant .................. F16K 27/044
251/172
2,882,009 A *  4/1959 Bryant .................. F16K 3/0227
251/172
(Continued)

FOREIGN PATENT DOCUMENTS

WO        2011/019937 A1     2/2011

OTHER PUBLICATIONS

International Search Report issued in PCT/US2016/033431 dated Jan. 23, 2017 (2 pages).
(Continued)

*Primary Examiner* — Umashankar Venkatesan
*Assistant Examiner* — Andrew J Rost
(74) *Attorney, Agent, or Firm* — Osha Bergman Watanabe & Burton LLP

(57) ABSTRACT

A flow control device includes a valve body, a first port disposed on the valve body, a second port disposed on the valve body, a gate disposed within the valve body and configured to control a flow of a fluid between the first port and the second port, and a seat disposed between the gate and the valve body, the seat including a first surface configured to form a circumferential seal with the valve body and a second surface configured to form a face seal with the gate. A method includes receiving, by a sealing assembly forming a circumferential seal between a seat and a valve body, a first force from a collar disposed on the seat in response to a first movement of a gate, and moving, in response to receiving the first force, the sealing assembly in a first direction of the first force.

16 Claims, 7 Drawing Sheets

(51) Int. Cl.
  *F16K 3/314* (2006.01)
  *F16K 31/06* (2006.01)
  *F16K 41/08* (2006.01)

(52) U.S. Cl.
  CPC .......... *F16K 3/314* (2013.01); *F16K 31/0668* (2013.01); *F16K 41/086* (2013.01)

(58) Field of Classification Search
  CPC ...... F16K 3/0236; F16K 3/207; F16K 3/0281; F16K 3/16; E21B 2200/01; F16J 15/164; F16J 15/166
  USPC .................................................. 277/520, 628
  See application file for complete search history.

(56) References Cited

U.S. PATENT DOCUMENTS

| | | | | |
|---|---|---|---|---|
| 3,401,915 A * | 9/1968 | Kim | ...................... | F16K 3/0227 251/174 |
| 3,890,991 A * | 6/1975 | Grove | ....................... | F15B 1/02 137/1 |
| 3,972,507 A * | 8/1976 | Grove | .................... | F16K 3/0227 251/172 |
| 4,643,395 A * | 2/1987 | Williams, Jr. | ........ | F16K 3/0236 251/172 |
| 5,624,101 A * | 4/1997 | Beson | ..................... | F16K 5/201 251/172 |
| 5,727,775 A * | 3/1998 | Rodger | ................... | E21B 34/02 251/172 |
| 6,279,875 B1 * | 8/2001 | Chatufale | ................ | F16K 3/207 251/171 |
| 6,345,805 B1 * | 2/2002 | Chatufale | ............ | F16K 5/0471 251/172 |
| 6,664,572 B2 * | 12/2003 | Chatufale | ............ | F16K 3/0227 251/309 |
| 6,966,537 B2 * | 11/2005 | Sundararajan | ........ | F16K 3/0227 251/172 |
| 7,004,452 B2 * | 2/2006 | Chatufale | ............ | F16K 3/0227 251/171 |
| 7,992,840 B2 * | 8/2011 | Cain | ..................... | F16K 3/0227 251/328 |
| 8,091,861 B2 * | 1/2012 | Nesje | ...................... | F16K 39/04 251/282 |
| 9,267,606 B2 * | 2/2016 | Haland | .................. | F16K 5/201 |
| 9,885,420 B2 * | 2/2018 | Sundararajan | ............ | F16K 3/20 |
| 10,281,047 B2 * | 5/2019 | Scattini | .................... | F16K 3/02 |
| 2009/0095934 A1 | 4/2009 | Cain et al. | | |
| 2014/0183392 A1 | 7/2014 | Hunter et al. | | |
| 2014/0183396 A1 * | 7/2014 | Hunter | ...................... | F16K 3/30 251/328 |

OTHER PUBLICATIONS

Written Opinion of the International Searching Authority issued in PCT/US2016/033431 dated Jan. 23, 2017 (6 pages).

\* cited by examiner

FRONT LOADED SEAT SEAL

BACKGROUND OF THE DISCLOSURE

Field of the Disclosure

The present disclosure relates generally to apparatus and methods for creating seals. More particularly, the present disclosure relates to a seat seal capable of high pressure, high temperature operation and a method of maintaining, a seal.

Description of the Related Art

The flow of fluids or gasses is sometimes controlled by valves. Valves may include an inlet port for receiving a fluid or gas and an outlet port for exhausting fluids or gasses. Between the inlet port and outlet port, a valve may include a flow control component. A flow control component may be operable and may move in response to a signal. When the flow control component is operated, a path between the inlet port and outlet port may be selectively opened or closed.

SUMMARY OF THE DISCLOSURE

In one aspect, embodiments disclosed herein relate to a flow control device including a valve body, a first port disposed on the valve body, a second port disposed on the valve body, a gate disposed within the valve body and configured to control a flow of a fluid between the first port and the second port, and a seat disposed between the gate and the valve body, the seat including a first surface configured to form a circumferential seal with the valve body and a second surface configured to form a face seal with the gate.

In another aspect, embodiments disclosed herein relate to a method including receiving, by a sealing assembly forming a circumferential seal between a seat and a valve body, a first force from a collar disposed on the seat in response to a first movement of a gate, and moving, in response to receiving the first force, the sealing assembly in a first direction of the first force.

In another aspect, embodiments disclosed here relate to a method including moving a gate disposed in a valve body between an open position and a closed position, the open position allowing fluid to flow from a first port to a second port of the valve body, and maintaining a seal between a seat and the gate while moving the gate, the seat forming a circumferential seal with the valve body and a face seal with the gate.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Specific embodiments will now be described with reference to the accompanying figures. In the following description, numerous details are set forth as examples of the disclosure. It will be understood by those skilled in the art that one or more embodiments of the present disclosure may be practiced without these specific details and that numerous variations or modifications may be possible without departing from the scope of the disclosure. Certain details known to those of ordinary skill in the art are omitted to avoid obscuring the description.

Embodiments of the disclosure include flow control devices and methods of maintaining seals in flow control devices. In one or more embodiments of the disclosure, flow control devices include a valve body having a first port and a second port. The first port may receive a fluid, such as a liquid or a gas, and the second port may exhaust the fluid.

The flow control device may include a gate housed within the valve body that controls the flow of fluids within the valve body and into or out of the first port and the second port. In one or more embodiments of the disclosure, the gate may be actuated to open or close a passage between the first port and the second port. By opening or closing the passage, fluid flow between the first port and the second port may be controlled.

The flow control device may also include at least one seat, disposed between the gate and the valve body. The at least one seat may create a seal between the gate and the valve body. By creating a seal between the gate and the valve body, fluid flow between the first port and the second port may be controlled.

In one or more embodiments of the disclosure, the seat may include a circumferential sealing surface that interfaces with a corresponding surface on the valve body to form a first seal. A sealing assembly may be disposed between the circumferential sealing surface of the seat and the corresponding surface on the valve body to form a circumferential seal.

The seat may also include an annular surface that interfaces with a planar surface on the gate to form a second seal. The second seal may be a face seal. By forming the first seal and the second seal, fluid may be prevented from flowing through the flow control device when the gate is in a closed position and fluids may prevented from leaking out of the flow control device along the gate.

Figure 1:
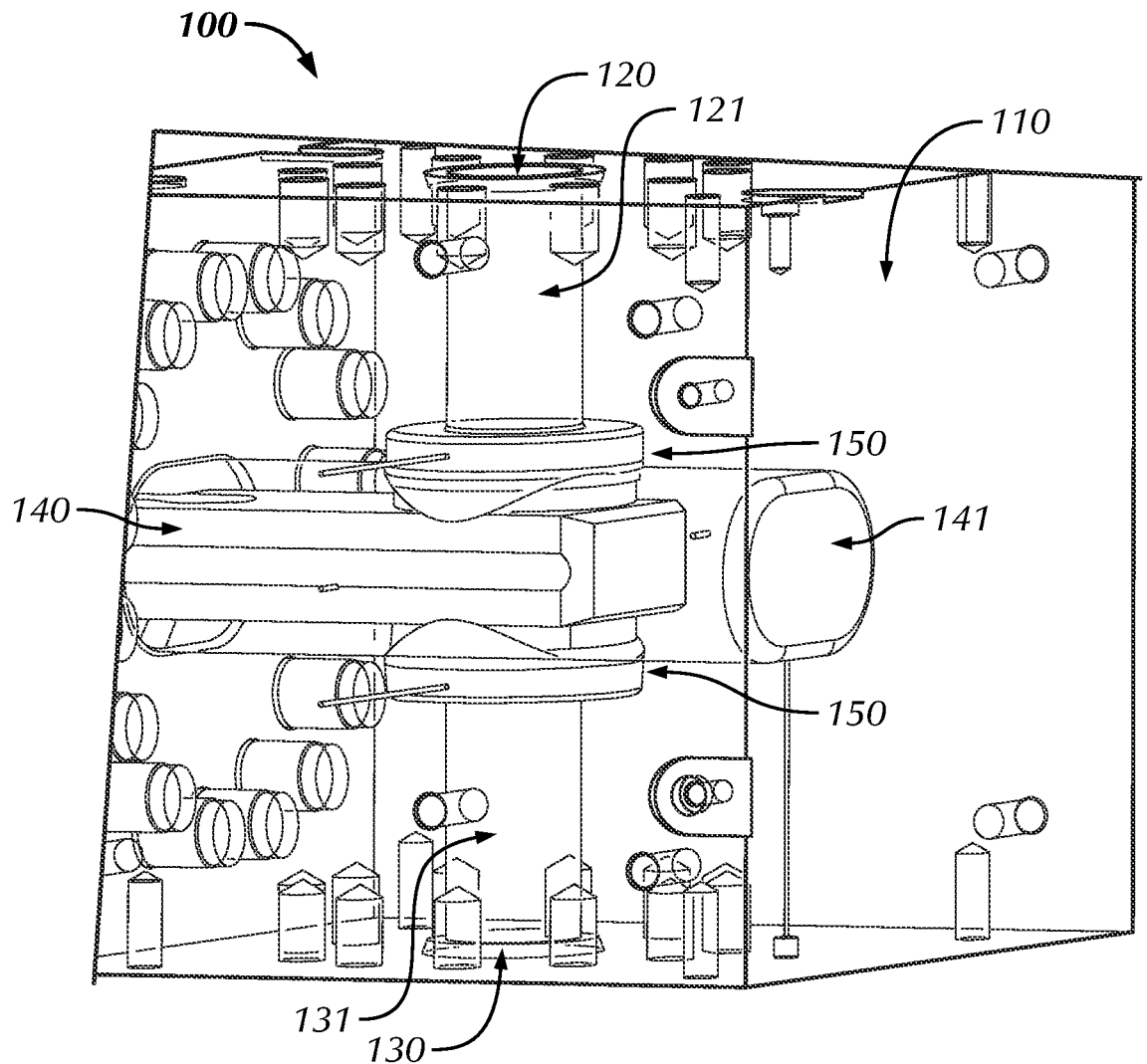
FIG. 1 shows an isometric view of a flow control device in accordance with one or more embodiments of the disclosure.

FIG. 1 shows an isometric view of the flow control device (100) in accordance with one or more embodiments of the disclosure. The flow control device (100) may include a valve body (110) having a first port (120) and a second port (130) each disposed on and extending through an exterior surface of the valve body (110). In one or more embodiments of the disclosure, the valve body (100) may be a monolithic structure formed from a structural material such as aluminum, steel, or an Inconel alloy such as Inconel 725. In some embodiments, the valve body (100) may be monolithic structure formed form a composite material. In one or more embodiments of the disclosure, the valve body (100) may include a number of monolithic subcomponents formed from a structural material, such as aluminum, steel, or an Inconel alloy such as Inconel 725. The monolithic subcomponents may be attached to one another to form the valve body (100). In one or more embodiments of the disclosure, the monolithic subcomponents may be attached by mechanical means, such as bolts, screws, etc., welding, or other means known in the art.

In one or more embodiments of the disclosure, the first port (120) may be connected to a gate cavity (141), within the valve body (110), by a first cavity (121). As used herein, "cavity" may refer to a hole, opening, channel, passageway, or space within a body. The first cavity (121) may extend inward from the first port (120), on an exterior surface of the valve body (110), and connect to the gate cavity (141). Similarly, the second port (130) may be connected to the gate cavity (141), within the valve body (110), by a second cavity (131). The second cavity (131) may extend inward from the second port (130), on an exterior surface of the valve body (110), and connect to the gate cavity (141). While the first cavity (121) and second cavity (131) are shown in FIG. 1 as having a cylindrical shape, one of ordinary skill in the art will appreciate that the shape of the first cavity (121) and the second cavity (131) may be other shapes or configurations known in the art without departing from the scope of the disclosure. For example, the first cavity (121) may have a conical shape, a rectangular prism shape, etc. In another example, the first cavity (121) may include a number of discrete cylindrical cavities, of the same or differing diameters, that connect the first port (120) to the gate cavity (141).

In one or more embodiments of the disclosure, the flow control device (100) further includes a gate (140) disposed within the gate cavity (141) of the valve body (110). The gate (140) may be may be actuated to open or close a passage within the gate cavity (141) between the first cavity (121) and the second cavity (131). By opening or closing the passage, fluid flow within the flow control device (100) may be controlled. The gate (140) may be actuated into an open position that opens the passage or the gate (140) may be actuated into a closed position that closes the passage.

The gate cavity (141) may also partially or fully house one or more seats (150). The seats (150) include a throughbore which axial align with the first cavity (121) or second cavity (131). The seats (150) may create seals between the valve body (110) and the gate (140). The seals may restrict fluid flow within the valve body (110) and ensure fluid flows between the first cavity (121) and the second cavity (131) when the gate (140) is in an open position rather than into the gate cavity (141). For example, when the gate (140) is actuated, the seal provided by the seat (150) may prevent fluids from flowing into the gate cavity (141). Thus, first and second seats (150) may be positioned on the gate (140) opposite each other, such that when the gate (140) is moved to the open position, fluid may flow from the first cavity (121), though the first seat (150), through the second seat (150) and out the second cavity (131), as shown in FIG. 2.

Figure 2:
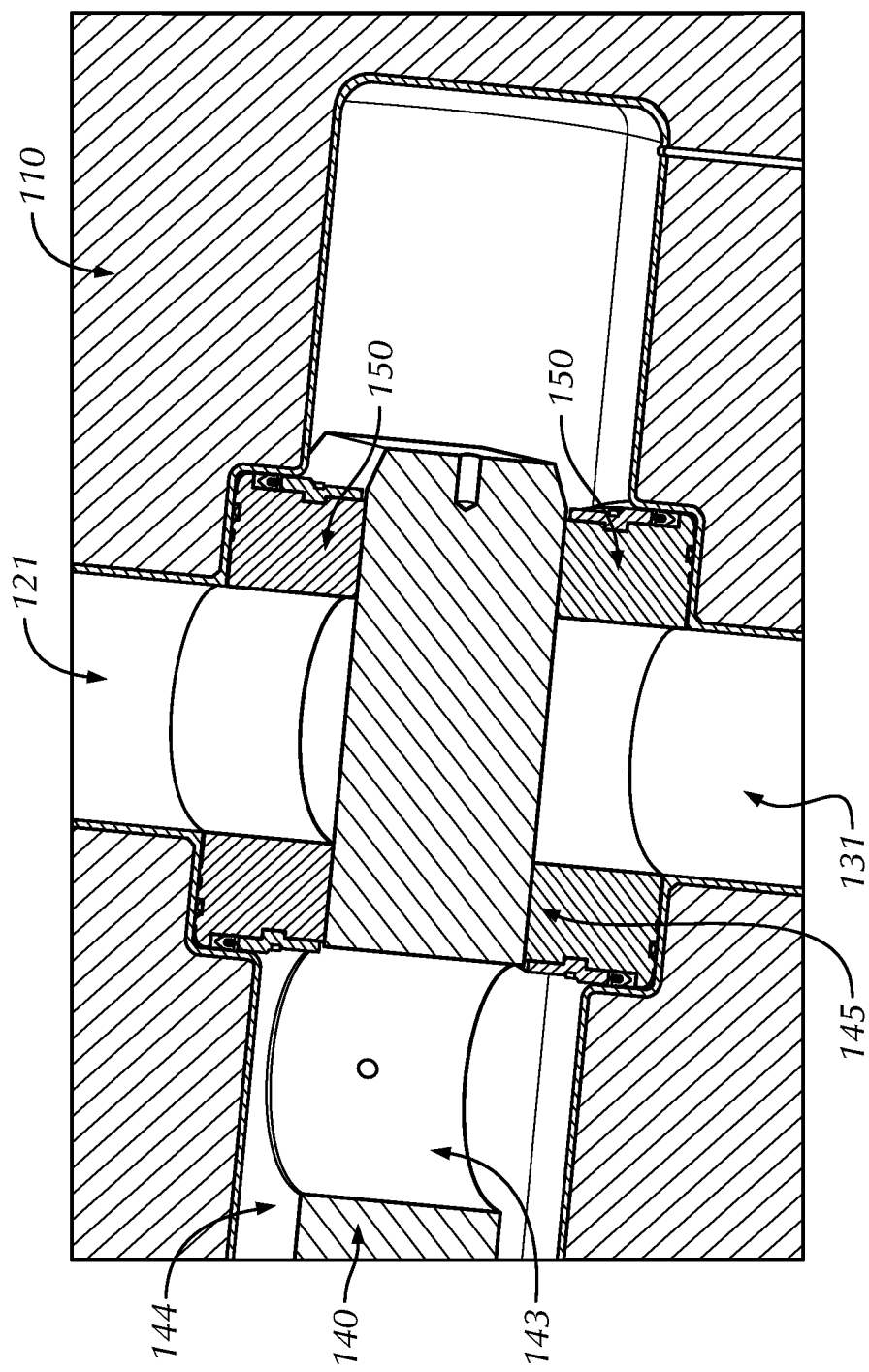
FIG. 2 shows a cutaway view of a flow control device in accordance with one or more embodiments of the disclosure.

FIG. 2 shows a cutaway view of the flow control device (100) in accordance with one or more embodiments of the disclosure. Specifically, FIG. 2 shows a cutaway view of a portion of the valve body (110), the first cavity (121), the second cavity (131), the gate (140), the gate cavity (141), and seats (150) near the intersection or the gate cavity (141) and the first cavity (121). The gate (140) may include an aperture (143) disposed between an upper mating surface (144) and a lower mating surface (145) of the gate (140). The aperture (143) may have a cross section corresponding to the cross section of the first cavity (121). For example, the aperture (143) is shown in FIG. 2 as having a circular cross section corresponding to the first cavity (121) also having a circular cross section. However, one of ordinary skill in the art will appreciate that the cross section of the aperture (143) may be other shapes or configurations known in the art without departing from the scope of the disclosure.

In one or more embodiments of the disclosure, when the gate (140) is in an open position, the aperture (143) may be aligned with the first cavity (121) and second cavity (131) to form a passage between the two cavities that enables fluid flow. When the gate (140) is in a closed position, the aperture (143) is not aligned with the first cavity (121) and the second cavity (131). When the aperture (143) is not aligned with the cavities, a solid portion of the gate (140) is disposed between the first and second cavities (121, 131), thereby restricting or preventing fluid flow. For example, in FIG. 2 the gate is illustrated in a closed position that aligns a solid portion of the gate (140) with the first and second cavities (121, 131) to restrict or prevent the flow of fluid between the first and second cavities (121,131).

One or more seats (150) may be housed in the gate cavity (141). Each seat (150) may form two seals, a first seal (300) between the valve body (110) and the seat (150) and a second seal (310) between the gate (140) and the seat (150). The first seal (300) between the valve body (110) and a first seat (150) may be perpendicular to the second seal (310) between the gate (140) and the first seat (150). By orienting the seals (300, 310) perpendicular to one another, embodiments of the disclosure may enable each seat (150) to move in a direction perpendicular to the upper mating surface (144) and the lower mating surface (145) of the gate (140) while maintaining the integrity of both seals. For example, as the gate (140) moves from left to right or right to left, as oriented in FIG. 2, the seats (150) may translate up or down (i.e., in a direction perpendicular to the gate (140)) due to variations in the vertical thickness of the gate (140). One of ordinary skill will appreciate that the seats may move in directions opposite to one another or the same direction, or independently from one another. As discussed in more detail below, embodiments of present disclosure allow the integrity of the first and second seals (300, 310) to be maintained even during such movement of the seats (150).

Figure 3:
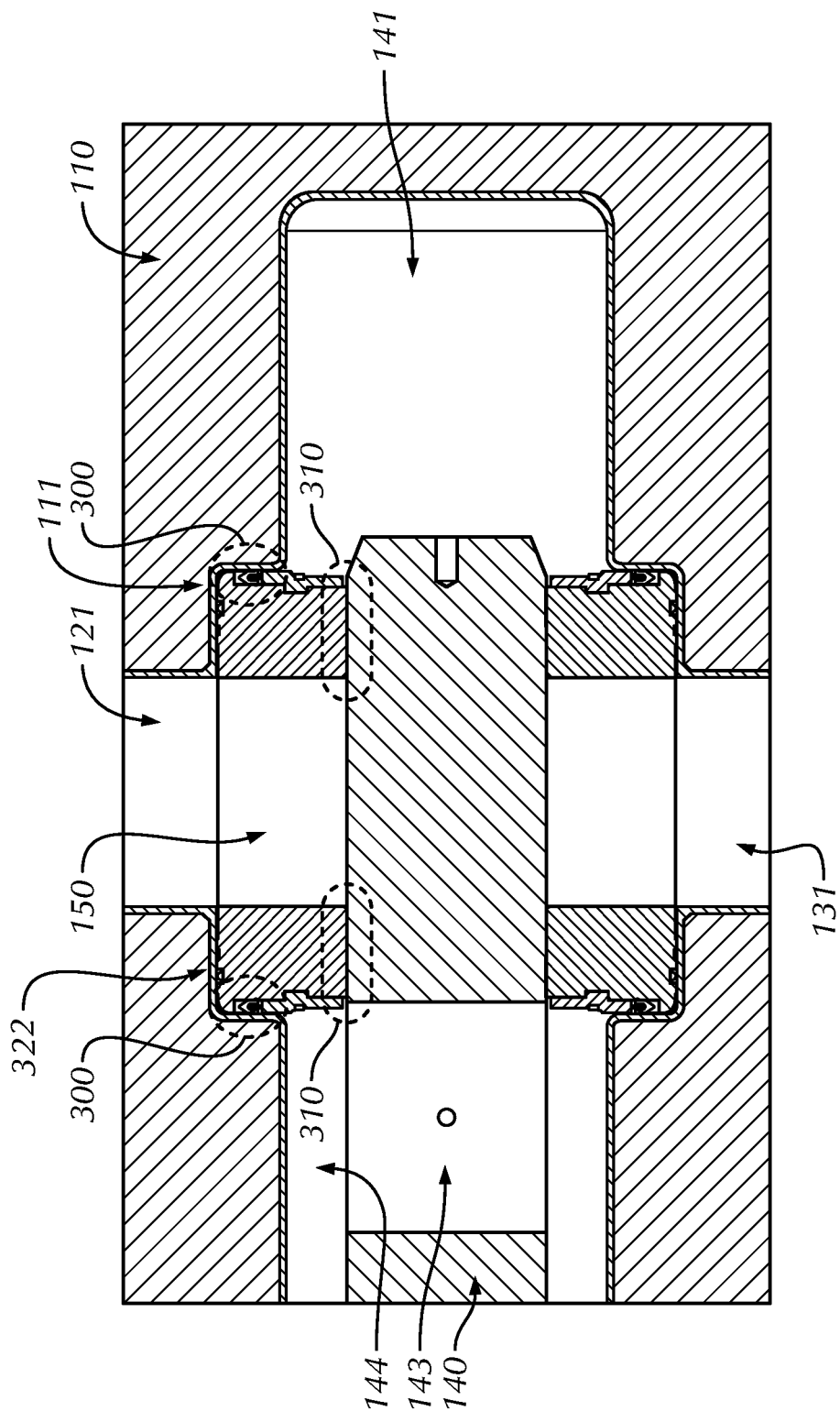
FIG. 3 shows a cross section view of a flow control device in accordance with one or more embodiments of the disclosure.

FIG. 3 shows a cross section view of the flow control device (100) in accordance with one or more embodiments of the disclosure. Specifically, FIG. 3 shows a view similar to FIG. 2, but rotated to clarify the location of the seals. As seen from FIG. 3, the valve body (110) may include a pocket (111) that receives a portion of a seat (150). The shape of the pocket (111) may correspond to the shape of the seat (150) and include a sealing surface (322). The sealing surface (322) of the pocket (111) may be oriented so that translation of the seat (150) into or out of the pocket (111) will not result in a breakdown of the first seal between the valve body (110) and the seat (150). As seen from FIG. 3, the first seal between the valve body (110) and the seat (150) may be a circumferential seal (300). Thus, if the seat (150) moves up or down, as oriented in FIG. 3, the circumferential seal (300) between the seat (150) and the valve body (110) may be preserved regardless of the movement of the seat (150) by sliding along the valve body (110). Accordingly, a length of the sealing surface 322 may be equal to or greater than a maximum distance the seat (150) can translate.

In one or more embodiments of the disclosure, the upper mating surface (144) of the gate (140) forms a second seal in the form of a face seal (310) with the seat (150). By forming a face seal (310) with the seat (150), the gate (140) may actuate between the open position and closed position without leaking fluid into the gate cavity (141). A returning member or biasing member (not shown), such as a spring (not shown in FIG. 3), may apply continuous pressure to the seats (150) directed toward the gate (140). By applying continuous pressure, the second seal (e.g., face seal (310)) may be preserved regardless of the movement of the seat (150). In other words, the second seal (310) may be maintained because the continuous pressure applied to the seat (150) keeps the seat (150) in continuous contact with an upper face of the gate (140), even with thickness changes of the gate (140) or other variations that may move the seat. In one or more embodiments of the disclosure, the face seal (310) may be on an annular surface of the seat (150).

By forming the circumferential seal (300) and the face seal (310), the seat may direct fluid from the first cavity (121) to the gate (140) without fluid entering the gate cavity (141), regardless of the actuation, movement, or position of the gate (140). For example, as the gate (140) moves from left to right or right to left, as oriented in FIG. 3, the seat (150) may translate up or down due to variations in the vertical thickness of the gate (140), motion of the gate (140), or other factors. As the seat (150) translates up or down, the face seal (310) may be maintained by continuous pressure applied by a wave spring (not shown in FIG. 3) disposed between the seat (150) and the pocket (111). The circumferential seal (300) may be maintained by translating along the sealing surface (322) of the pocket (111). Thus, embodiments of the disclosure may enable a seat (150) to translate without breaking either of the circumferential seal (300) or the face seal (310).

Figure 4:
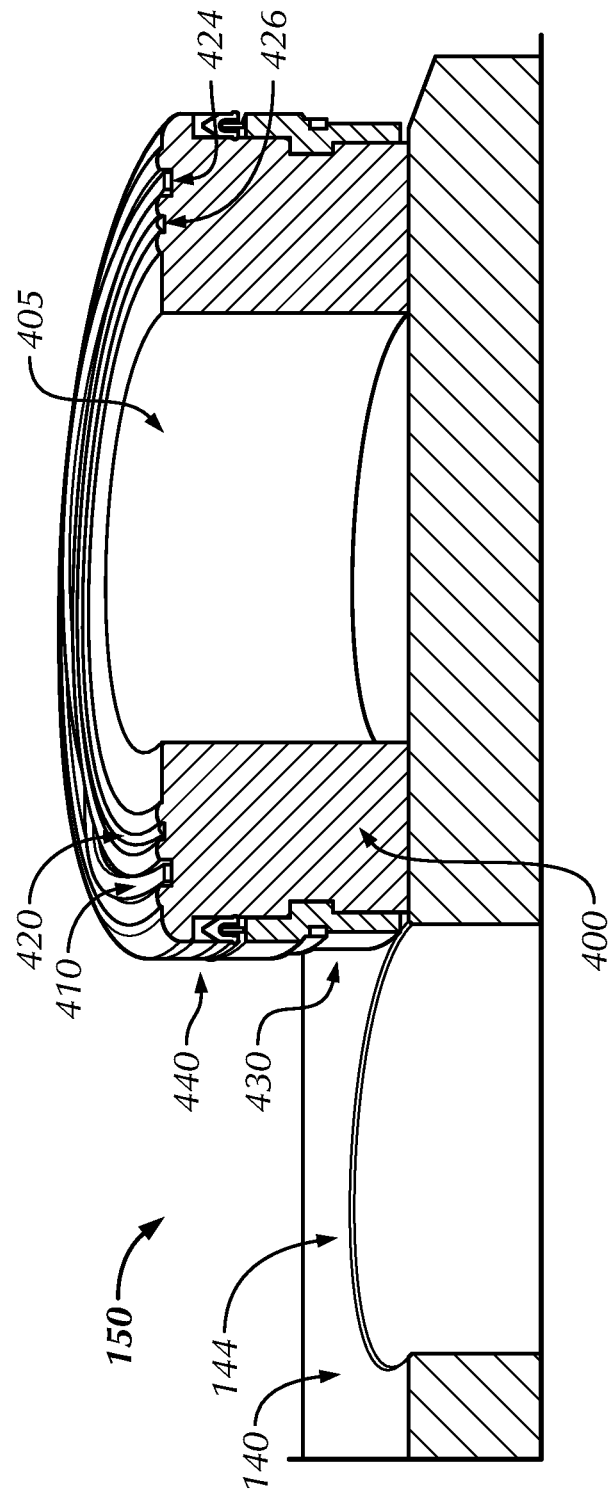
FIG. 4 shows a cutaway view of a seat and a gate device in accordance with one or more embodiments of the disclosure.

FIG. 4 shows an isometric view of one seat (150) disposed on the gate (140) in accordance with one or more embodiments of the disclosure. The seat (150) may include a body (400) of a structural material such as steel, aluminum, or an Inconel alloy such as Inconel 725. The body may have a shape corresponding to the shape of the pocket (111) in the valve body (110). For example, with reference to FIG. 3, the seat pocket (111) is generally cylindrical and, returning to FIG. 4, the body (400) is generally cylindrical. However, one of ordinary skill in the art will appreciate that the pocket (111) and the body (400) may be other shapes or configurations known in the art without departing from the scope of the disclosure.

In one or more embodiments of the disclosure, the body (400) may include a body aperture (405) having a cross section corresponding to a cross section of the first cavity (121, FIG. 1). The body aperture (405) may allow fluids to flow from the first cavity (121, FIG. 1) to the gate (140). However, one of ordinary skill in the art will appreciate that the cross section of the body aperture (405) may be other shapes or configurations known in the art without departing from the scope of the disclosure. For example, the body aperture (405) may be elliptical, rectangular, or other shapes that may or may not correspond to the cross section of the first cavity (121, FIG. 1) without departing from the scope of the disclosure.

The seat (150) may include the returning member, such as a wave spring (410), disposed on a surface of the body (400) opposite the gate (140). The wave spring (410) may have a generally circumferential shape. In some embodiments, a circumferential groove (424) may be formed in the surface of the body (400) opposite the gate (140) in which the wave spring (410) may be at least partially disposed. One of ordinary skill in the art will appreciate that the shape of the wave spring (410) (and therefore, the groove (424)) may be other shapes or configurations known in the art without departing from the scope of the disclosure. The wave spring (410) may press against a surface of the body (400) and the valve body (110, FIG. 1) to maintain the face seal (310, FIG. 3) between the seat (150) and the gate (140). By pressing against the valve body (110, FIG. 1), the wave spring (410) applies a force to the body (400) that is directed toward the gate (140). As the seat (150) moves in response to actuation of the gate (140), the force applied by the wave spring (410) maintains the face seal (310, FIG. 3). In one or more embodiments of the disclosure, the wave spring (410) is a nickel based alloy such as ELGILOY, a cobalt, chromium, nickel alloy.

The seat (150) may also include a top seal (420) disposed on a surface of the body (400) opposite the gate (140). The top seal (420) may have a generally circumferential shape. In some embodiments, a second circumferential groove (426) may be formed in the surface of the body (400) opposite the gate (140) in which the top seal (420) may be at least partially disposed. One of ordinary skill in the art will appreciate that the shape of the top seal (420) (and therefore the second groove (426)) may be other shapes or configurations known in the art without departing from the scope of the disclosure. The top seal (420) may be polytetrafluoroethylene or similar material. The top seal (420) may create a seal between the body (400) of the seat (150) and the valve body (110, FIG. 1), e.g. pocket (111, FIG. 3). The top seal (420) may provide a backup seal to the circumferential seal (300) and/or the face seal (310).

Figure 5:
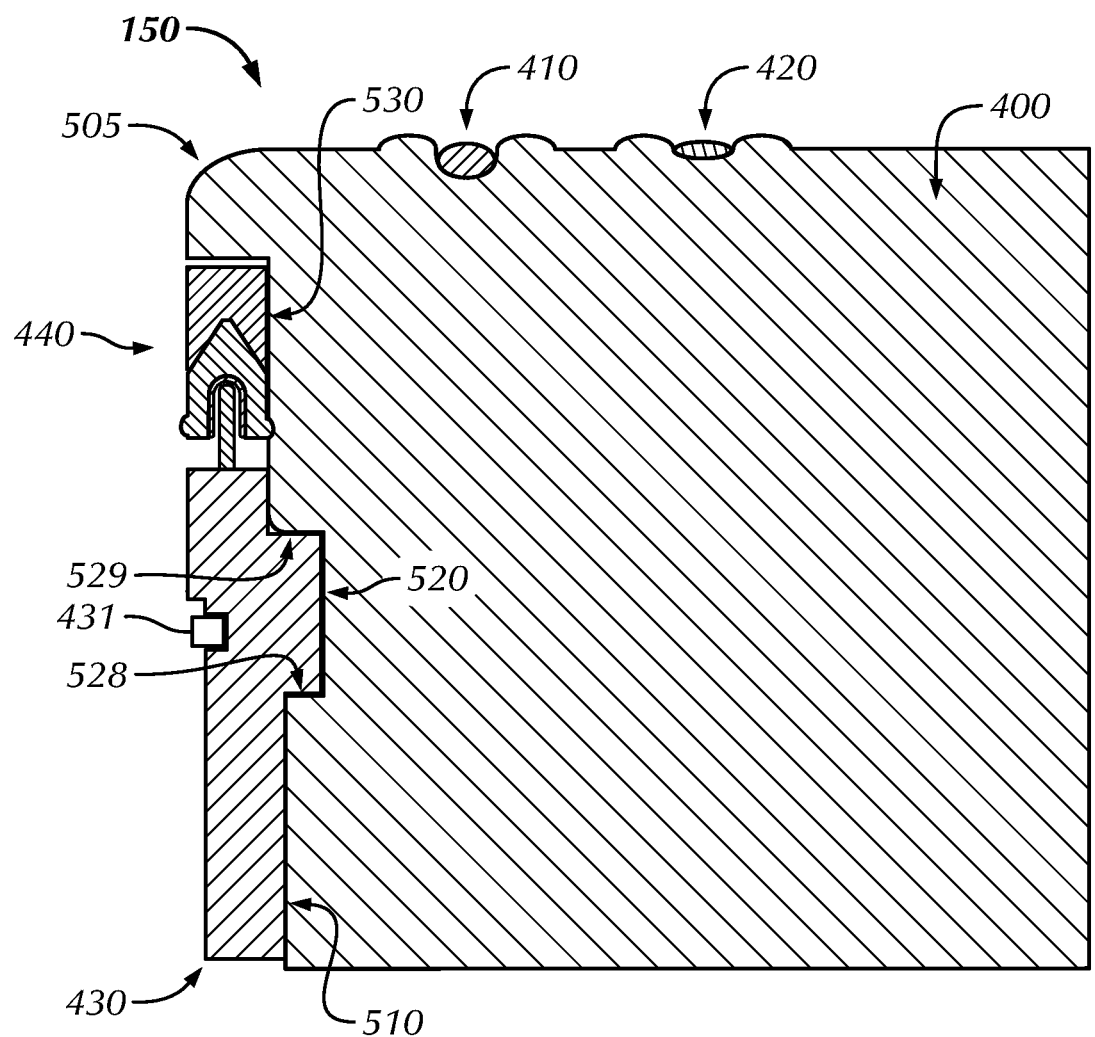
FIG. 5 shows a cross section view of a seat in accordance with one or more embodiments of the disclosure.

The seat (150) may also include a sealing assembly (440) and a collar (430), each disposed on an outer surface (510) of the body (405) corresponding to the shape of the pocket (111, FIG. 3). The sealing assembly (440) and collar (430) are further shown in FIGS. 5 and 6 and described below. Although only one seat is shown in FIGS. 4 and 5, one of ordinary skill in the art will readily appreciate that a second seat, as shown in FIG. 3, may include various features and elements as described with respect to FIGS. 4 and 5. The features and elements of the second seat may be oriented oppositely from those of the first seat, such that the various features and elements are similarly oriented between the seat (150), valve body (110), and gate (140). For example, where one seat (150) may include top seal (420), a second seat may include a similar seal (a "bottom" seal) on a surface of the body of the second seat opposite the gate (140).

FIG. 5 shows a cross section view of hair of one seat (150) in accordance with one or more embodiments of the disclosure. The collar (430) may have a shape corresponding to a portion of an outer surface (510) of the body (400). For example, as the outer surface (510) of the body (400) shown in FIG. 4 is generally cylindrical, the shape of the collar (430) may be generally cylindrical. However, one of ordinary skill in the art will appreciate that the shape of the collar (430) may be other shapes or configurations known in the art without departing from the scope of the disclosure.

The outer surface (510) of the body (400) may include a recess (520) that forms a lower shoulder (528) and an upper shoulder (529) and that accepts a portion of the collar (430) between the lower shoulder (528) and upper shoulder (529). The collar (430) may be formed as at least two pieces and may be attached to the body (400) by a retention band (431) to insert the portion of the collar (430) into the recess (520). When the collar (430) is attached to the body (400), the portion disposed in the recess (520) may maintain the position of the collar (430) along the seat (150), e.g., the collar (430) may not translate up or down along the outer surface (510). The collar (430) may be formed from a structural material such as steel, aluminum, or Inconel alloy, such as Inconel 725. The retention band (431) may similarly be formed from a structural material such as steel, aluminum, or Inconel alloy.

The outer surface of the body (400) may include an overhanging edge (505) extending from the surface of the body (400) opposite the gate (140). The overhanging edge (505) may be separated from the collar (430) along the outer surface (510) of the body (400) by a guidance area (530). The guidance area (530) may receive the sealing assembly (440) and maintain the position of the sealing assembly (440). For example, if the seat (150) moves upward as oriented in FIG. 5, the collar (430) may apply a force to the sealing assembly (440) that moves the sealing assembly (440) up. Similarly, if the seat (150) moves downward, the overhanging edge (505) may apply a force to the sealing assembly (440) that moves the sealing assembly (440) down. Thus, the overhanging edge (505) and the collar (430) may maintain the relative position of the sealing assembly (440) with respect to the body (400).

The sealing assembly (440) may provide the circumferential seal (300, FIG. 3) between the body (400) and the valve body (110, FIG. 1). The sealing assembly (440) may include a number of subcomponents which are shown in FIG. 6.

Figure 6:
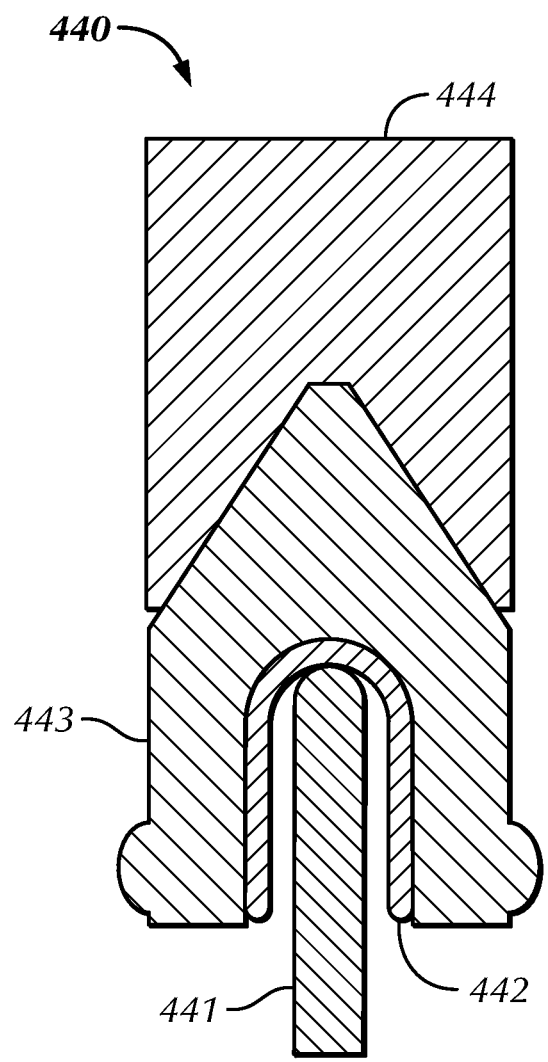
FIG. 6 shows a cross section view of a sealing assembly in accordance with one or more embodiments of the disclosure.

FIG. 6 shows a cross section view of the sealing assembly (440) in accordance with one or more embodiments of the disclosure. The sealing assembly may have a shape corresponding to the guidance area (530). The sealing assembly (440) may include a positioning band (441) and retention member (442). The positioning band (441) may have a first end that is disposed on the collar (430, FIG. 5) and a second end that is disposed on or configured to contact the retention member (442). The positioning band (441) may receive force from the collar (430, FIG. 5) as the body (400, FIG. 5) of the seat (150) moves. By receiving the applied force, the positioning band (441) may cause the sealing assembly (440) to move in response to movements of the body (400) of the seat (150) and thereby maintain the relative position of the sealing assembly (440) with respect to the body (400). In one or more embodiments of the disclosure, the positioning band (441) may be a stainless steel band having a shape corresponding to the outer surface (510, FIG. 5) of the body (400, FIG. 5), for example, cylindrical, annular, etc.

The retention member (442) may disperse force applied by the positioning band (441) to the other components of the sealing assembly (440). As shown in FIG. 6, the retention member (442) may have a U-shaped cross section that receives the positioning band (441) on a first side and the other components of the sealing assembly (441) on a second side. Thus, the retention member (442) may distribute forces received from the positioning band (441) which prevents damage to other components of the sealing assembly (440). In one or more embodiments of the disclosure, the retention member (442) may be a stainless steel alloy, such as 316 stainless steel.

The sealing assembly (440) may also include a lower sealing member (443) and an upper sealing member (444). The lower sealing member (443) may be disposed on the second side of the retention member (442) and may be directly attached to the upper sealing member (444). In one or more embodiments of the disclosure, the lower sealing member (443) may be polytetrafluoroethylene and the upper sealing member may be Polyether ether ketone (PEEK). The lower sealing member (444) and upper sealing member (444) may be attached by a V shaped joint. However, one of ordinary skill in the art will appreciate that the shape of the joint between the lower sealing member (444) and upper sealing member (444) may be other shapes or configurations known in the art without departing from the scope of the disclosure. The total height of the sealing assembly (440) may be equal to, slightly smaller or slightly larger than the total height of the guidance area (530, FIG. 5), such that when positioned between the collar (430, FIG. 5) and the over-hanging edge (505, FIG. 5), the components of the sealing assembly (430) may be locked together.

The lower sealing member (443) and upper sealing member (444) may create a circumferential seal (330, FIG. 3) between the body (400, FIG. 5) of the seat (150) and the valve body (110, FIG. 1) by direct contact. As seen in FIG. 5, the width of seal assembly (440) fills the space between the body (500) and the valve body (110, FIG. 1). Thus, the sealing assembly (440) may allow the seat (150, FIG. 3) to translate into or out of the pocket (up or down with respect to FIG. 3) while maintaining the circumferential seal (330, FIG. 3). As described above with respect to FIGS. 4 and 5, one of ordinary skill in the art will appreciate that the second seat, as shown in FIG. 3, may include various features and elements as described with respect to FIG. 6. Thus, features and elements of the sealing assembly of the second seat may be oriented oppositely from those of the first seat, such that the various features and elements are similarly oriented between the seat (150), valve body (110), and gate (140).

Figure 7:
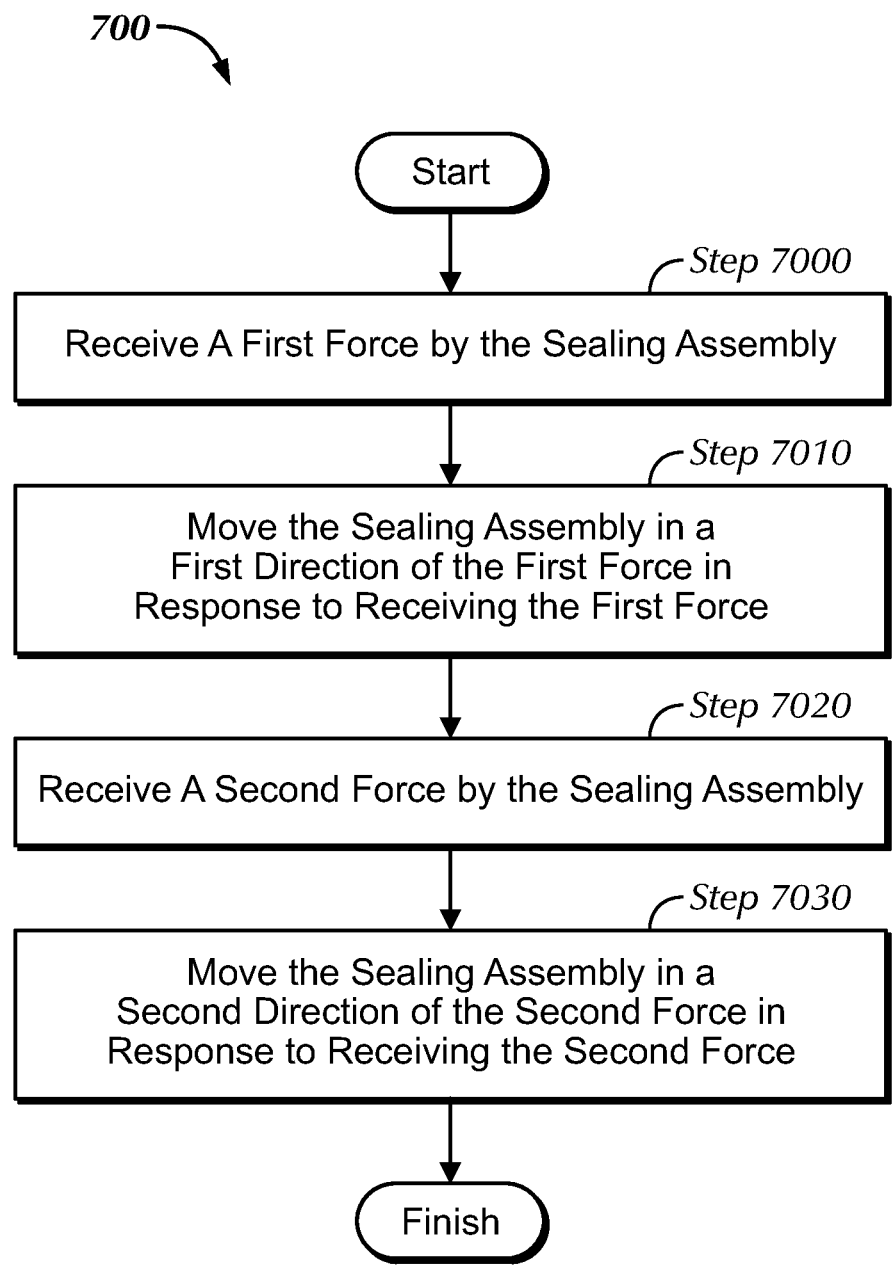
FIG. 7 shows a method in accordance with one or more embodiments of the disclosure.

FIG. 7 shows a flowchart (700) according to one or more embodiments of the disclosure. The method depicted in FIG. 7 may be used to maintain a circumferential seal in a flow control device in accordance with one or more embodiments of the disclosure. One or more steps shown in FIG. 7 may be omitted, repeated, and/or performed in a different order among different embodiments.

At Step 7000, a sealing assembly, forming a circumferential seal between a seat and a valve body, receives a first force from a collar, disposed on the seat, in response to a first movement of a gate. For example with reference to FIG. 5, the seat (150) may receive a force directed in an upward direction due to a first movement of the gate. The first force may be first received by the body (400). The first force may be transmitted to the collar (430) by the lower shoulder (528) of the recess (520). The force may be transmitted from the collar (430) to the sealing assembly (440) by the direct contact of the positioning band (441) and the collar (430).

Returning to FIG. 7, at Step 7010, the sealing assembly moves in a first direction of the first force in response to receiving the first force. For example with reference to FIG. 5, the sealing assembly (440) may move in an upward direction in response to the first force received by the positioning band (441).

At Step 7020, the sealing assembly receives a second force. The second force may be in a direction opposite the first force. For example with reference to FIG. 5, the seat (150) may receive the second force directed in a downward direction due to a second movement of the gate. The wave spring (410), acting as a returning member, may generate the second force, by compressing, in response to the first force. The wave spring (410) may transmit the generated second force to the body (400). The body (400) may transmit the second force to the sealing assembly (440) by the overhanging edge (510).

Returning to FIG. 7, at Step 7030, the sealing assembly moves in a second direction of the second force in response to receiving the second force. For example with reference to FIG. 5, the sealing assembly (440) may receive the second force from the overhanging edge (510) by the upper sealing member (444, FIG. 6). The sealing assembly may move in a downward direction in response to receiving the second force.

Thus, the sealing assembly may maintain the circumferential seal (300, FIG. 3) by moving in response to a first or second pressure. Similarly, the face seal (310) may be maintained by the continuous and direct contact of the body (400, FIG. 4). For example with reference to FIG. 4, as the gate (140) moves the wave spring (410) may apply a continuous force to the body (400) directed toward the gate (140). Accordingly, as the gate (140) moves, the lace seal (310, FIG. 3) may be maintained by the pressure applied by the wave spring (410) and the circumferential seal (300, FIG. 3) may be maintained by the movement of the sealing assembly (440).

One of ordinary skill in the art will appreciate that both first and second seats (150) may operate by the same method described in flowchart (700). In some embodiments, the first seat (150) disposed above the gate (140) as shown in FIG. 3 may move in the first direction, e.g., in the upward direction away from the gate (140), and the second seat (150) disposed below the gate (140) may similarly move in the first direction, e.g., in the downward direction away from the gate (140), at the same time. In other embodiments, the first seat (150) above the gate (140) may move in the first direction, e.g., in the upward direction away from the gate (140), while the second seat (150) disposed below the gate (140) may move in the second direction, e.g., in the upward direction toward the gate (140), at the same time. In other embodiments, the first seat (150) above the gate (140) may move in the second direction, e.g., in the downward direction toward the gate (140), while the second seat (150) disposed below the gate (140) may move in the first direction, e.g., in the downward direction away from the gate (140), at the same time. In still other embodiments, one seat (150) may remain stationary while the other seat (150) moves in either the first direction or the second direction. In each of these various movements of the seats (150), a seal is maintained between the seats (150), the gate (140) and the valve body (110).

A method in accordance with embodiments disclosed herein may include moving a gate disposed in a valve body between an open position and a closed position, the open position allowing fluid to flow from a first port to a second port of the valve body, and maintaining a seal between a seat and the gate while moving the gate, the seat forming a circumferential seal with the valve body and a face seal with the gate. The seal may be maintained by applying a continuous pressure to a face of the seat opposite the face seal. The seal may also be maintained by transmitting a first force from a collar disposed around the seat to a sealing assembly disposed around the seat in response to a first movement of the gate. The seal may also be maintained by transmitting a second force from a returning member to sealing assembly disposed around the seat.

A flow control device according to one or more embodiments of the disclosure may be capable of operating under high pressure, high temperature conditions. For example, in some embodiments, a flow control device in accordance with embodiments disclosed herein may be capable of operating under pressures of 15 Ksi (103 MPa) or greater and temperatures of greater than 350° F. (176° C.).

Incorporation of an over-hanging edge having a large radius into the seat may provide a positive sealing differential area which ensures high cavity pressure bleed down during operation of the flow control device. Further, is of a wave spring ensures a consistent face seal between the seat and the gate which reduces leaks during low pressure operations. Additionally, by incorporating a guidance area into the body of the seat, the seat may be precisely assembled and aligned to the pocket without the need for special tooling or fixtures. Lastly, by providing a guidance area fir the sealing assembly, extrusion of the sealing assembly during normal operation is reduced which improves the service life of the flow control device.

While the disclosure has been described above with respect to a limited number of embodiments, those skilled in the art, having the benefit of this disclosure, will appreciate that other embodiments can be devised which do not depart from the scope of the disclosure as disclosed herein. Accordingly, the scope of the disclosure should be limited only by the attached claims.

What is claimed is:

1. A flow control device, comprising:
   a valve body;
   a first port disposed on the valve body;
   a second port disposed on the valve body;
   a gate disposed within the valve body and configured to control a flow of a fluid between the first port and the second port;
   a seat disposed between the gate and the valve body, the seat comprising a first surface configured to form a circumferential seal with the valve body and a second surface configured to form a face seal with the gate;
   an overhanging edge extending from a third surface of the seat, wherein the third surface of the seat is opposite the second surface of the seat, and wherein an outer diameter of the overhanging edge defines a maximum outer diameter of the seat that is greater than an outer diameter of all other outer surfaces of the seat;
   a collar disposed on a portion of the first surface and configured to form a lower stop of a guidance area, wherein the overhanging edge forms an upper stop of the guidance area; and
   a sealing assembly disposed in the guidance area and configured to form the circumferential seal, the sealing assembly comprising:
      a positioning band configured to receive a first force from the collar, directed away from the face seal, in response to a first movement of the gate; and
      an upper sealing member configured to receive a second force from the overhanging edge, directed toward the face seal in response to a second movement of the gate.

2. The flow control device according to claim 1, wherein the flow control device further comprises:
   a return member disposed between the seat and the valve body and configured to generate the second force in response to the first movement of the gate.

3. The flow control device according to claim 2, wherein the flow control device further comprises:
   a lower sealing member disposed between the positioning band and the upper sealing member and configured to form the circumferential seal.

4. The flow control device according to claim 3, wherein the lower sealing member is formed from polytetrafluoroethylene, the upper sealing member is formed from polyether ether ketone, and the positioning band is formed from a stainless steel alloy.

5. The flow control device according to claim 1, further comprising a second seat disposed between the gate and the valve body, the second seat positioned opposite the seat, the second seat comprising a fourth surface configured to form a circumferential seal with the valve body and a fifth surface configured to form a face seal with the gate.

6. The flow control device according to claim 1, wherein the first surface of the seat includes a recess forming a lower shoulder and an upper shoulder in which at least a portion of the collar is inserted.

7. The flow control device according to claim 1, further comprising a spring configured to apply pressure to the seat in a direction toward the gate.

8. The flow control device according to claim 1, further comprising a seal disposed between the valve body and a surface of the seat opposite the gate.

9. The flow control device according to claim 8, wherein the seal is disposed in a circumferential groove formed in the surface of the seat opposite the gate.

10. A method comprising:
receiving, by a sealing assembly forming a circumferential seal between a seat and a valve body, a first force from a collar disposed on the seat in response to a first movement of a gate, the collar disposed at least partially within a recess formed in a first surface of the seat and configured to form a lower stop of a guidance area;
preventing, with the circumferential seal, fluid from entering a gate cavity of the gate;
moving, in response to receiving the first force, the sealing assembly in a first direction of the first force;
receiving, by the sealing assembly, a second force from an overhanging edge of the seat, in response to a second movement of the gate; and
moving, in response to receiving the second force, the sealing assembly in a second direction of the second force.

11. The method according to claim 10, wherein the first direction is opposite the second direction.

12. The method according to claim 10, wherein the second force is generated by a return member in response to the first force.

13. A method comprising:
moving a gate disposed in a valve body between an open position and a closed position, the open position allowing fluid to flow from a first port to a second port of the valve body;
maintaining a seal between a seat and the gate while moving the gate, the seat forming a circumferential seal with the valve body and a face seal with the gate, the maintaining the seal comprising transmitting a first force and a second force, the transmitting the second force including engaging a sealing assembly disposed around the seat with an overhanging edge of the seat, the overhanging edge defining a maximum diameter of the seat that is greater than an outer diameter of all other outer surfaces of the seat; and
preventing, with the circumferential seal, fluid from entering a gate cavity of the gate.

14. The method according to claim 13, wherein the maintaining the seal comprises applying a continuous pressure to the seat in a direction toward the gate.

15. The method according to claim 13, wherein the transmitting the first force includes transmitting a force from a collar disposed around the seat to the sealing assembly disposed around the seat in response to a first movement of the gate.

16. The method according to claim 13, wherein the maintaining the seal comprises transmitting the second force from a spring to the sealing assembly disposed around the seat.

* * * * *